Oct. 17, 1967     K. EINSTEIN ET AL     3,347,183

DOUGH METERING APPARATUS

Filed May 26, 1965     3 Sheets-Sheet 1

*INVENTORS*
KARL EINSTEIN
BERNARD W. REITER

BY Paul Malern

ATTORNEY

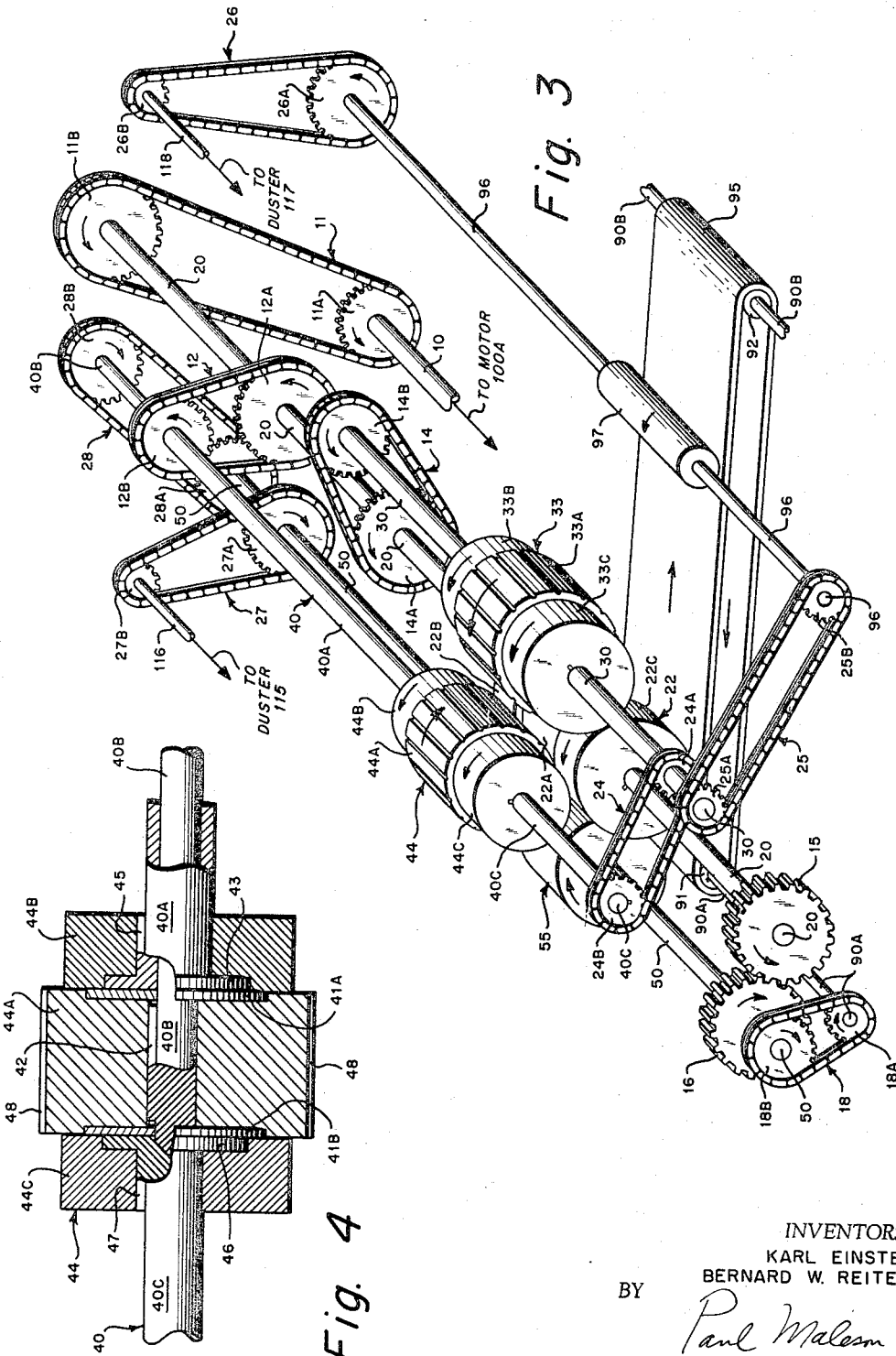

INVENTORS
KARL EINSTEIN
BERNARD W. REITER

BY Paul Maleson

ATTORNEY

500
United States Patent Office 3,347,183
Patented Oct. 17, 1967

3,347,183
DOUGH METERING APPARATUS
Karl Einstein, 6020 Alma St., Philadelphia, Pa. 19149, and Bernard W. Reiter, 1001 City Ave., Philadelphia, Pa. 19151
Filed May 26, 1965, Ser. No. 458,901
11 Claims. (Cl. 107—69)

ABSTRACT OF THE DISCLOSURE

An apparatus to meter dough into measured slugs suitable for further handling. The dough is kneaded by counterrotating rollers. Other rollers form the dough into an elongated strip, and a timed reciprocating knife cuts the dough into sections, which are carried on a conveyer belt.

---

Figure 1:
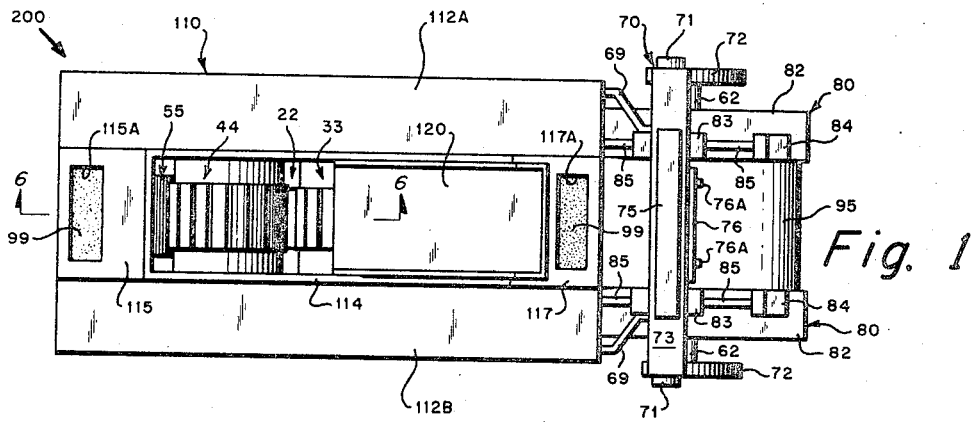

This invention relates to a machine for metering dough. It relates to an apparatus useful in bakeries for the continuous provision of a plurality of chunks or pieces of dough of a desired volume.

In a commercial baking process, a piece of dough of desired volume is placed in a mold or is otherwise shaped to form some desired product such as a muffin, for example. Of course, this finally shaped piece of dough is then baked. The present invention relates only to apparatus for the provision of the volumetrically measured slugs, chunks, or pieces, which are then used for final shaping. The present apparatus is not a weighing or automatic weighing machine, but instead provides a continuing series of equal volume slugs of generally elongated box-like configuration. The machine also kneads, shapes and otherwise processes the dough, and it has been found that the dough is of sufficiently even texture and density so that the produced slugs are very close in weight.

Heretofore, such slugs have generally been produced by hand. Hitherto known machines for this purpose have generally suffered the disadvantage of having a principle of mechanical operation so that the dough was too roughly handled. The rough handling of dough, as for example by extruding with a piston and die, or using a plunger to force it into a mold, may tend to "burn" the dough, which is a term well understood in the baking art. Rough handling of this type has a deleterious effect on the unbaked dough.

It is an object of this invention to provide a dough metering apparatus.

It is an object of this invention to provide an apparatus to knead dough, form it into an elongated slab of generally rectangular cross-section, to cut said slab into a serial plurality of slugs of selected and selectively variable longitudinal dimensions.

Other aims and objects of this invention are made apparent in the following specification and claims.

Figure 2:
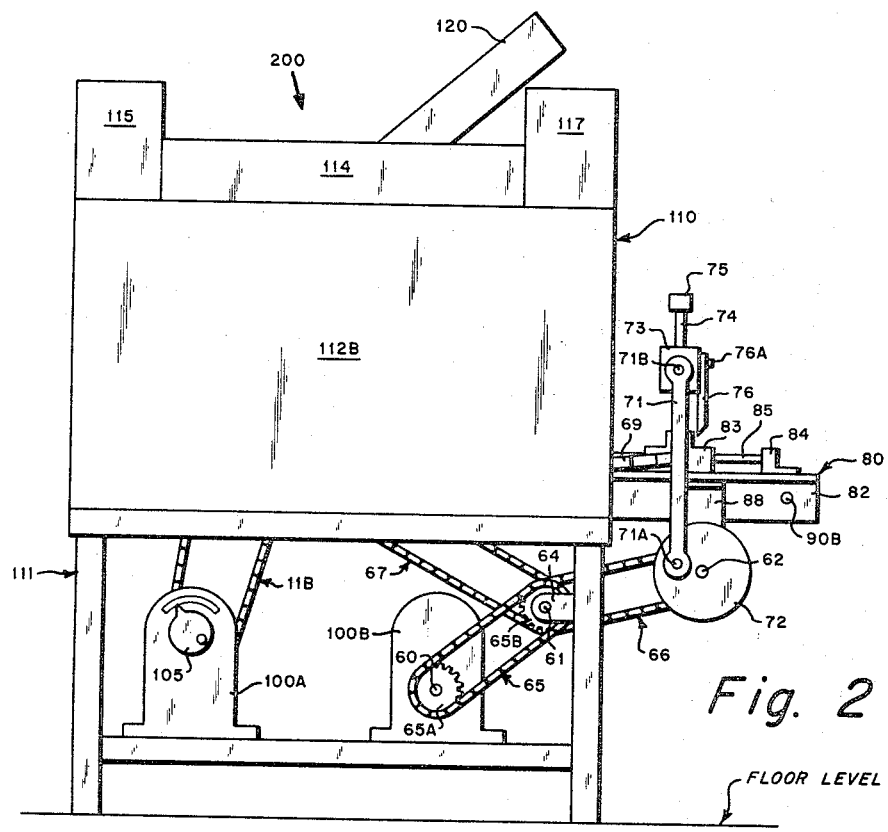
Figure 7:
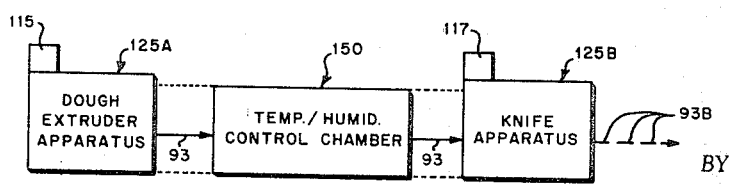
Figure 5:
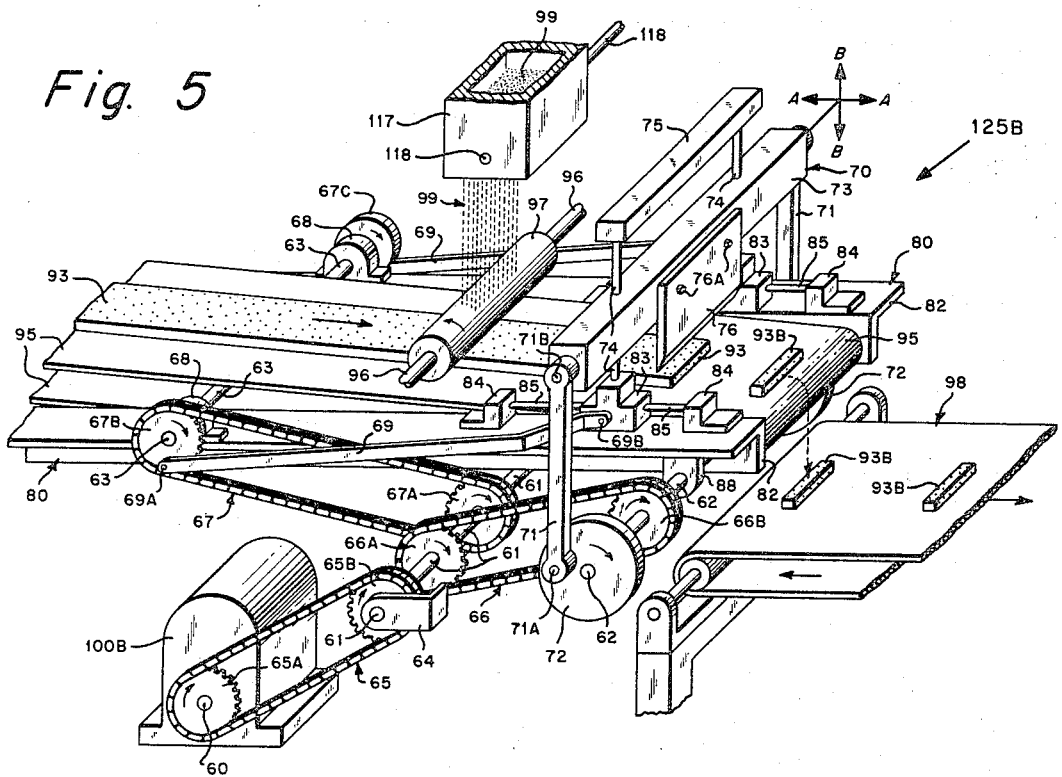
Figure 6:
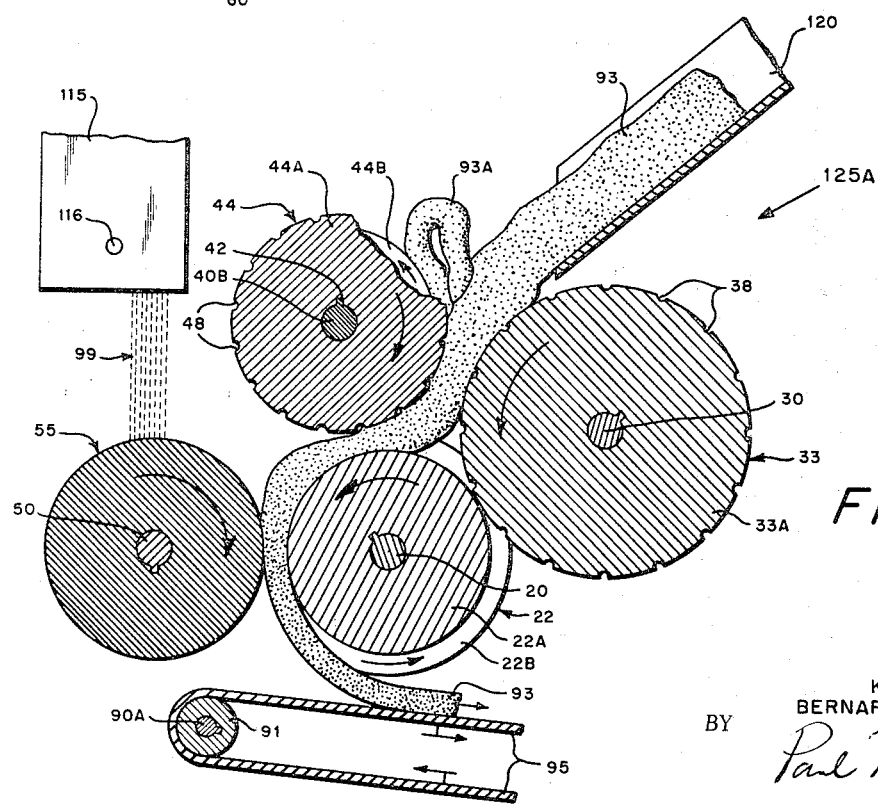

The invention is best understood in connection with the accompanying drawings in which like reference numerals refer to like parts and in which:

FIGURE 1 is a plan view of the apparatus;
FIGURE 2 is a left side elevation of the apparatus;
FIGURE 3 is a detailed view of the rollers and the associated shafts, sprockets and drives, with the shafts extended to show the drive relationships;
FIGURE 4 is a partly fragmented, partly cross-sectional view of the counterrotating roller;
FIGURE 5 is a perspective view showing the cutting means;
FIGURE 6 is a cross-sectional elevation view of the rollers and the dough passing therethrough; and
FIGURE 7 is a schematic view of an alternate embodiment of the apparatus, in which the knife means is separated from the roller means.

In brief, raw dough is placed in a chute or hopper at the top of the machine. A pair of opposed rollers seize the dough. Each of the rollers has a segmental structure. One of the initially opposed rollers has one segment rotating oppositely to the other roller, and two side segments rotating in the same direction as the other roller. The dough is then led between two further forming rollers which knead and compact it, and form it into an elongated continuous slab. A moving belt carries this slab underneath a reciprocating knife whose speed of reciprocation is selectively variable. Parting agents are applied where required.

The invention is best initially understood in connection with FIGURES 3 and 6. The apparatus may generally be considered as comprising a forming section and a cutting section. FIGURES 3 and 6 are mainly directed to the forming section, and generally designated 125A. The cutting section is generally designated 125B and is best shown in FIGURE 5.

In FIGURE 6, a chute or hopper 120 is provided. Raw dough 93 is placed in this chute by any means. At the bottom of the chute, a part of opposed initial rollers are provided. These rollers take the dough from the bottom of the chute and propel it into the remainder of the apparatus. They also serve a kneading, compacting, and somewhat of a forming function. The initial rollers are of a rather complex structure. One of these rollers may be called a solid roller 33, and includes a central knurled section 33A which is provided with a plurality of knurls defined by the grooves 38. On each side of the central knurled section 33A is a smooth section 33B and 33C. As best shown in FIGURE 3, the smooth sections have somewhat smaller diameters than the central knurled section.

Solid roller 33 is mounted for rotation on shaft 30. It rotates as a unit in the direction shown by the arrows in FIGURE 3 and the arrow in FIGURE 6.

The other initial roller is the counterrotating roller 44. The counterrotating roller 44 is of the same size and configuration as solid roller 33. It is provided with a central knurled section 44A, whose knurls are defined by a plurality of grooves 48, as shown. On each side of central knurled section 44A, is provided a smooth section 44B and 44C. A central knurled section rotates on inner shaft 40B. It is affixed to this shaft by spline 42. The direction of rotation of the central knurled section 44A is in the direction of the arrows as shown in FIGURES 3 and 6, and is opposite to the rotation of solid roller 33. The direction of rotation of each of smooth sections 44B and 44C is in the direction of the arrows, shown in FIGURES 3 and 6, and is opposite to that of central section 44A.

As shown best in FIGURE 4, first smooth roller side section 44B is affixed to a first outer shaft section 40A by spline 45 and second smooth roller side section 44C is affixed to a second outer shaft section 40C by spline 47. As best shown in FIGURE 3, the outer shaft sections 40B and 40C extend from opposite sides of the counterrotating roller 44 and are driven to rotate in the same direction, as is seen from the arrows and the linkages. It is, therefore, in the same direction as that of solid roller 33. For purposes of reference, the direction of rotation of smooth sections 44B and 44C is called counterrotation. The entire roller 44 is called a counterrotating roller for identification and ease of reference.

The provision of a counterrotating roller surprisingly solves an annoying problem. If a pair of ordinary opposed rollers is provided at the bottom of a quantity of dough, it has been found that while some dough is taken between the rollers and passed through, other portions of the dough tend to remain above the rollers, and to rotate or otherwise move in a useless way. Such portions of the dough tend to pile up at the side of the rollers. The provision of the counterrotating roller provides a situation in which all the dough initially placed in the chute eventually is taken between the opposed initial rollers and is passed through the machine. In FIGURE 6, a piece of stray dough 93A is shown in a typical formation. Such a piece of dough which would simply hang up at the side of simple opposed rollers, is here fed through the machine because of the counterrotation of the smooth roller sections 44B and 44C. The exact sequence of forces acting on any individual dough may be very complicated and may vary. Generally, it may be said that dough which would be left stranded above the rollers if they were simple opposed rollers is jogged or displaced from its equilibrium by contacting one of the counterrotating rollers and is thus given another opportunity to be fed in.

The provision of the knurls has been found highly preferable, since it enables the apparatus to be used with those of a wide difference in texture. For certain doughs, however, it has been found that the knurls are not essential. If the knurls are omitted, however, it has been found that certain doughs will then not properly feed whereas others will. Therefore, the provision of knurls is highly preferable.

The dough 93 then passes through a set of forming rollers. The arrangement and sequence of the sets of rollers is best shown in FIGURE 6. The forming rollers comprise a channeled roller 22 and a pressure roller 55. Each of these rollers is solid, and they move in opposed rotation as shown by the arrows in FIGURES 3 and 6. Channeled roller 22 has a central section 22A and a side section 20B on one side thereof and a side section 22C on the other side thereof. The side sections 22A and 22B are of an equal diameter which is greater than that of central section 22A. It will be appreciated that the central section and the side sections together form a channel around the circumference of the channeled roller 22. The channeled roller is affixed to and rotates on shaft 20.

The other one of the pair of forming rollers is the pressure roller 55 which is coacting with and opposed to the channeled roller 22. It rotates in a direction opposite to that of the channeled roller, as shown by the arrows in FIGURES 3 and 6. Pressure roller 55 is mounted for rotation on shaft 50. Pressure roller 55 has a width equal to that of the center section 22A of channeled roller 22. Pressure roller 55 is spaced from channeled roller 22 so that the circumference of the pressure roller is just tangent to or intersects slightly the circumference of the side sections 22B and 22C of the channeled roller. The rollers are so axially aligned that the sides of pressure roller 55 coincide with the inwardly facing surfaces of the sides of the side sections 22B and 22C. Thus, a view downwardly between the forming rollers would show a substantially closed rectangular opening, one dimension of which would be the width of the pressure roller 55, and the other dimension of which would be the difference in radius between the side sections 22B and 22C and the central section 22A.

The dough passing from the initial rollers passes between the forming rollers and is shaped into the elongated slab of rectangular cross-section as has been described. It is apparent that the cross-sectional configuration of the slab corresponds to the spacing between the forming rollers, as has been described.

The dough 93 which has now been formed into the slab as described, passes from the forming rollers and onto the surface of an endless belt 95. Endless belt 95 passes over a driven belt roller 91 mounted for rotation on shaft 90A, and over idler belt roller 92, which is mounted for rotation on shaft 90B. The elongated slab of dough 93 is carried on the surface of the endless belt to the cutting section, as shown in FIGURE 5 for example.

The cutting section includes a vertically reciprocating knife means. Before reaching this knife or cutting means, the dough slab 93 passes beneath a hold-down roller 97 mounted for rotation on shaft 96. The purpose of the hold-down roller is to prevent the dough from rising up off the surface of the endless belt 95 when the knife raises.

The operation and structure of cutting section 125B is best seen in FIGURE 5. The cutting means itself is herein referred to as a knife, since this is the preferred and general form.

The knife descends to cut the slab of dough and then it rises. Since the dough is moving continuously under the knife at the rate of speed of the movement of endless belt 95, it is desirable that the knife have a forward component of motion during the time that it is in contact with the dough to provide a cleaner and neater cut.

The knife thus has a vertical and horizontal component of motion at various positions in its travel. The horizontal component is indicated by the arrows A—A, and the vertical component is indicated by the arrows B—B in FIGURE 5.

Knife 76, here shown as a sharpened blade, is fastened with screws 76A, or by any other convenient means to a yoke 73. This yoke 73 is connected at each end to bell crank levers 71 by means of a pivot 71B. Each bell crank lever 71 is pivoted at its lower end with a pivot 71A to a crank wheel 72. Crank wheel 72 is mounted for rotation on shaft 62 in the direction indicated by the arrow thereon in FIGURE 5. It is apparent that the rotation of crank wheel 72 provides a vertically reciprocating motion to knife 76.

Yoke 73 is guided by vertical rods 74 which fits with a sliding fit through vertical holes in yoke 73. A bridge 75 connects the vertical rods 74 at the upper ends thereof. The vertical rods 74 are given a reciprocating horizontal motion by means described below.

Each vertical rod 74 is anchored at its lower end in a slide block 83. Each slide block 83 is provided with a horizontal hole therethrough to accommodate with a sliding fit a horizontal guide rod 95. Each horizontal guide rod 85 is held at its ends in brackets 84 which are, in turn, firmly affixed to the framework of the machine.

Each slide block 83 is connected to a bell crank lever 69 at a pivot 69B. One bell crank lever 69 is affixed to a crank wheel 67B which may also be described as a crank sprocket 67B, at a pivot 69A. The other bell crank lever 69 is affixed to a crank wheel 67C. The crank sprocket 67B and crank wheel 67C are mounted for rotation on a shaft 63. Shaft 63 is held in bearings 68 and, as best shown in FIGURE 5, shaft 63 passes underneath the upper surface of endless belt 95. The bearings 68 are firmly affixed to the frame of the machine.

The rotation of the crank wheels 76B and 67C imparts a reciprocating horizontal motion to the slide bocks 83 and thence to the knife 76.

The cutting means is generally designated 70. It will be appreciated that the cutting means include a vertical motion assembly and a horizontal motion assembly which has been described above in detail. The position of the crank wheels is set so that when knife 76 is descending and starts to cut dough 93, the horizontal forward motion starts to approach its maximum velocity. Theoretically, the maximum forward horizontal velocity should occur when knife 76 reaches the bottom dead center of its stroke. This timing will provide the cleanest and most nearly vertical cut in the dough 93. The maximum velocity of forward horizontal motion should be at least equal to and preferably slightly greater than the horizontal velocity of the dough 93.

It is thus apparent that the knife 76 will be moved backward with a horizontal component when it is raised and clear of the dough 93.

The slab of dough 93 thus emerges from the cutting section 125B in the form of individual slugs 93B, as best shown in FIGURE 5. These slugs are carried to the end of the endless belt 95 where they pass onto a conveyor 98. For clarity of presentation, conveyor 98 is shown substantially below the end of endless belt 95, and the slugs are shown by the phantom line arrow as making a substantial drop. In practice, the levels of the belts would be more nearly equal and the drop is preferably less to avoid unnecessary rough handling or deformation of the slugs 93B.

Certain parts of the apparatus coming in contact with the dough have been found to be preferably provided with means to prevent their adhesion thereto. This is done by the provision of a parting agent. One such part is the hold-down roller 97. As best shown in FIGURES 1, 2 and 5, parting agent dispensing means 117 are provided above this roller. In the embodiment shown, the parting agent dispensing means includes a flour container 117A, which is provided with a quantity of flour 99. A rotating dispensing shaft 118 extends through the container 117A. The bottom of the container is preferably provided with a transverse slot of adjustable dimensions, and the dispensing shaft 118 is provided with a plurality of fins or raised projections extending in the same direction as the slot, and the shaft is positioned near the slot opening. This structure permits the dispensing of a continuously falling controlled shower of flour 99. The flour, constantly falling on hold-down roller 97, acts as the required parting agent and prevents the dough 93 from adhering to the hold-down roller.

The pressure roller 55 is also preferably provided with a continuously applied parting agent. As best shown in FIGURES 1, 2, and 6, the parting agent dispensing means 115 includes a container 115A. A shaft 116 extends transversely through container 115A and operates and is constructed as has been described in connection with dispensing means 117. The structure and operation of dispensing means 115 and 117 is the same. The exact detailed structure of these parting agent dispensing means is not shown in the drawings, since in and of themselves, their structure is both well known in the art and is also obvious, as well as being described in the specification. Furthermore, the exact structure of the dispensing means is not critical to this invention.

Instead of the dusting of flour to act as a parting agent, a slow drip or dispensing of a liquid parting agent such as oil has also been found to be satisfactory. Any suitably controlled slow dispensing means for a liquid may be used as the parting agent dispensing means.

The operation of the counterrotating roller 44 as it coacts with the other elements of the machine has been described above. The detailed structure of this counterrotating roller is best understood in connection with FIGURE 4. The smooth section 44C is affixed to shaft 40C by means of a spline 47. Shaft 40C terminates in a hub 46. As best shown at the left side of FIGURE 6, hub 46 is received into a fitting recess in one side of smooth section 44C. Thus, the rotation of shaft 40C rotates smooth section 44C.

The smooth section 44B is affixed to a hollow shaft 40A. Hollow shaft 40A is keyed to smooth section 44B by means of spline 45. The hollow shaft 40A terminates in a hub 43, which is received into a fitting recess in one phase of the smooth section 44B. Thus, smooth section 44B rotates with the hollow shaft 40A. As shown in FIGURES 3 and 6, and as described above, smooth sections 44B and 44C rotate in the same direction.

The central knurled section 44A is positioned between the smooth sections 44B and 44C and closely abuts them. As has been described and shown, it is arranged for rotation in a direction opposite from the smooth sections. The central knurled section 44A is keyed for rotation to an inner shaft 40B by a spline 42. A disc 41B is received into a fitting recess on one side of central knurled section 44A and a disc 41A is received into a fitting recess on the other side of the knurled section. As shown, these discs have central openings. Inner shaft 40B passes through the central opening in disc 41A, and a small extension of this shaft passes through the opening in disc 41B. The discs 41A and 41B provide a bearing surface against the hubs 43 and 46 and also act as retainers.

As best shown at the right side of FIGURE 4, the inner shaft 40B extends from the right side through the hollow shaft 40A. Clearance is provided so that the shafts may rotate independently. The arrangement of an inner shaft and a hollow shaft on one side and the solid shaft 40C on the other, together comprise a compound shaft 40, which is the means by which the counterrotating roller 44 is rotated with its proper motions.

The moving elements of the forming section 125A, the cutting section 125B, including the necessary parting agent dispensing means are all driven by means of a system of sprockets, chain drives, shafts, and other structure, as has been described. The exact arrangement of the sprocket and chain drives system to produce the required motions is shown best in FIGURE 3 and, to a lesser extent, in FIGURES 2 and 5. The primary moving means for the elements are variable speed motor drives 100A and 100B. Each of these variable speed motor drives is provided with speed adjusting means 105. The variable speed motor drives 100A and 100B are standard devices well known in the art, and their exact structure is not critical to this invention and is not considered a part of the invention per se. Typically, such variable speed drives include an electric motor and a system of pulleys and belts, all contained in a single housing, in which the relative operative diameters of the pulleys are adjustable by means of the speed adjusting means 105. Motor and gear reducer sets are another way of providing this desired function.

The variable speed drive 100B is directed to activating the cutting section 125B, and the variable speed drive 100A activates the forming section 125A. In the preferred embodiment shown, each of these drives is independently infinitely variable over its available speed range, so that a wide and smooth variation between the speeds of the cutting section and the forming section are provided for the operator. By adjusting the relative speed of the two drives, the operator has a wide latitude of careful control over the exact size of the slugs and, therefore, the weight of the slugs 93B may be controlled.

The manner in which the motor drives 100A and 100B are connected to the various moving elements may be fully understood by following through the system of shafts, sprockets, and chains in FIGURES 2, 3, and 5, in which the directions of rotation of the elements are indicated by arrows. The variable drive 100B which controls the cutting section is described first with reference to FIGURES 2 and 5. Variable drive 100B rotates shaft 60 on which is mounted sprocket 65A. A set of sprockets 65B, 66A and 67A are mounted on shaft 61 which is held for rotation on support 64.

Chain 65 connects sprocket 65A to sprocket 65B, thus causing rotation of sprockets 66A and 67A.

Sprocket 66A is connected by means of chain 66 to sprocket 66B. Sprocket 66B is mounted on shaft 62 which is supported in support 88. The crank wheel 72 is thus rotated and the remainder of this train of motion has already been described.

Chain 67 connects sprocket 67A to sprocket 67B, and the remainder of this train of motion has already been described. Thus, the cutting section is operated at a selected speed by motor drive 100B. As a matter of arbitrary choice, the hold-down roller 97, which may properly be interpreted as belonging to the cutting section, happens to be driven from variable speed drive 100A.

The forming section 125A is driven from variable speed drive 100A, and this chain of operation is best shown in FIGURE 3. The drive 100A rotates shaft 10 on which is mounted sprocket 11A. Sprocket 11A is connected to sprocket 11B by chain 11. Chain 11 rotates shaft 20. Sprocket 12A, sprocket 14A, channeled roller 22, and gear 15 are all mounted on shaft 20. Sprocket 14B is connected to sprocket 14A by chain 14. Sprocket 14B rotates shaft 30.

Solid roller 33, sprocket 24A and sprocket 25A are all mounted on shaft 30 for rotation. Chain 25 connects sprocket 25A to sprocket 25B. Sprocket 25B is mounted on shaft 96 which extends across the surface of the endless belt 95.

Hold-down roller 97 is mounted on shaft 96. Shaft 96 is continued across the endless belt 95 to sprocket 26A. Sprocket 26A is connected by chain 26 to sprocket 26B. Sprocket 26B rotates shaft 118 which activates the parting dispensing means or duster 117, as has been described. The operation of the hold-down roller has been described.

Sprocket 12A is connected by chain 12 to sprocket 12B. Sprocket 12B is connected to hollow shaft 40A. References to compound shaft 40, hollow shaft 40A, inner shaft 40B and shaft 40C are best understood in connection with FIGURE 4 and the detailed description thereof which has been made. The sprocket 24A is connected by chain 24 to sprocket 24B. Sprocket 24B is mounted on shaft 40C. As has been described, hollow shaft 40A rotates smooth section 44B and shaft 40C rotates smooth section 44C of the counterrotating roller 44.

Gear 15 meshes with gear 16. Gear 16 is mounted on shaft 50. Sprocket 18B, pressure roller 55, sprocket 27A and sprocket 28A are all mounted on shaft 50.

Sprocket 18B is connected by chain 18 to sprocket 18A which rotates shaft 90A. Shaft 90A drives the driven belt roller 91 which rotates endless belt 95.

Sprocket 27A is connected by chain 27 to sprocket 27B which, in turn, rotates shaft 116 which operates parting agent dispensing means or duster 115, as has been described. Sprocket 28A is connected by chain 28 to sprocket 28B. Sprocket 28B is mounted on inner shaft 40B, and has been described, inner shaft 40B passes inside hollow shaft 40A and rotates the central knurled section 44A of the counterrotating roller 44. It is understood that the various shafts are mounted on appropriate bearings and supports which are all held on the general frame 80.

The complete dough metering apparatus is generally designated 200. A lower section side cover 112B and a lower section top cover 112A are provided. An upper section side cover 114 is provided. The over-all supporting framework and protective covers may be generally designated 110. The entire unit rests on a table-like support 111, which is seemed to have a lower horizontal section which holds the motor drives.

The rollers are made preferably of heavy machined steel and the shafts associated with these rollers are preferably of good grade and substantially dimensioned steel since the forces exerted are considerable. Typically, the channeled roller 22 may have an inner section of a diameter of approximately 6.6 inches and a side section diameter of approximately 8.4 inches. The width of the channel thus formed may typically be about 3 inches. The diameter of a shaft connected to one of the initial or forming rollers may be typically about 1¼ inches.

FIGURE 7 shows an alternate embodiment of the invention in which the forming section 125A is physically removed at a greater distance from the cutting section 125B than is shown in the embodiment illustrated in the other drawings. In this embodiment, the endless belt 95, as illustrated in FIGURES 3 and 5, for example, is greatly extended in length and passes through a temperature and humidity control chamber 150. This control chamber 150 may typically be many feet in length, and its purpose is to permit the dough 93 after being formed to attain greater dimensional stability. The advantage of this is so that when the cutting section produces the individual slugs 93B, these slugs will not subsequently undergo any substantial dimensional change. The problem may be encountered if such dimensional change occurs in the slugs is that closely adjacent slugs may touch other and stick together.

The scope of this invention is to be determined by the appended claims and is not to be limited to the foregoing description and drawings, which are illustrative.

We claim:

1. A dough metering apparatus for providing a serial plurality of equal volume slugs of dough of selected size from a mass of raw dough, comprising (a) a forming section including a pair of opposed initial rollers to take said mass of dough, and a pair of forming rollers, said forming rollers together defining a channel, said initial rollers including one solid roller and one counterrotating roller, said counterrotating roller comprising a central section and two side sections, said central section rotating in one direction and said side sections rotating in the opposite direction, only said rollers forming said mass of dough to a continuous elongated slab of dough, and (b) a cutting section including cutting means, said cutting means being provided with means to pass reciprocatingly through said slab transverse to the direction of movement of said slab, to cut said slab into a serial plurality of slugs.

2. A dough metering apparatus as set forth in claim 1, wherein said solid roller is knurled, and said counterrotating roller has a knurled center section and smooth side sections.

3. A dough metering apparatus as set forth in claim 1, wherein said forming rollers comprise a channeled roller and a pressure roller, said channeled roller having a central section and a side section on each side thereof, said side sections having diameters greater than that of said central section, and said pressure roller having a width approximately equal to the width of said center section of said channeled roller, the circumference of said pressure roller being at least nearly tangential to the circumference of said side sections of said channeled roller.

4. A dough metering apparatus as set forth in claim 1, wherein an endless belt extends from below said forming rollers to below said cutting means to continuously carry said elongated slab of dough from said forming section to said cutting section.

5. A dough metering apparatus as set forth in claim 4, wherein means are provided to impart to said cutting means, a component of motion in the direction of travel of said slab when said cutting means is passing through said slab, and a component of motion opposed to direction of travel of said slab when said cutting means is reciprocatingly withdrawn from said slab.

6. A dough metering apparatus as set forth in claim 5, wherein said means to provide said reciprocating motion of said cutting means through said slab transverse to the direction of travel of said slab and the component of motion of said cutting means in the same direction as and opposed to the direction of the travel of said slab, comprises a bell-crank including a crank wheel, a yoke to support said cutting means, and a bell-crank lever connecting said yoke and said crank wheel.

7. A dough metering apparatus as set forth in claim 6, wherein said cutting section includes a hold-down roller between said forming section and said cutting means, near said cutting means, to hold said elongated slab of dough on said endless belt.

8. A dough metering apparatus as set forth in claim 1, wherein a parting agent dispensing means is provided over at least one roller contacting said dough, to dispense parting agent onto said roller to prevent said roller from sticking to said dough.

9. A dough metering apparatus as set forth in claim 8, wherein said cutting section and said forming section are each provided with adjustable speed motor drives.

10. A dough metering apparatus as set forth in claim 9, wherein said cutting section is provided with an adjustable speed drive having an infinite speed selectivity within its range, and said forming section is provided with a different adjustable speed drive having an infinitely variable speed selectivity within its speed range.

11. A dough metering apparatus as set forth in claim 10, wherein said endless belt is extended, and a temperature and humidity control chamber is provided over said endless belt between said forming section and said cutting section.

References Cited
UNITED STATES PATENTS

| | | | |
|---|---|---|---|
| 1,126,606 | 1/1915 | Wolf | 107—4 |
| 1,945,755 | 2/1934 | Scruggs | 107—12 X |
| 2,784,683 | 3/1957 | Curtis et al. | 107—12 X |

WALTER A. SCHEEL, *Primary Examiner.*

J. SHEA, *Assistant Examiner.*